United States Patent
Smyth et al.

(10) Patent No.: US 12,304,874 B2
(45) Date of Patent: May 20, 2025

(54) METHOD FOR FABRICATING AN ENVIRONMENTAL BARRIER COATING ON A CERAMIC MATRIX COMPOSITE

(71) Applicant: RTX CORPORATION, Farmington, CT (US)

(72) Inventors: Imelda P. Smyth, North Palm Beach, FL (US); Sarah A. Frith, Jupiter, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/471,373

(22) Filed: Sep. 21, 2023

(65) Prior Publication Data
US 2024/0010574 A1 Jan. 11, 2024

Related U.S. Application Data

(62) Division of application No. 16/536,629, filed on Aug. 9, 2019, now Pat. No. 11,866,380.

(51) Int. Cl.
| | | |
|---|---|---|
| C04B 41/50 | (2006.01) | |
| C04B 35/565 | (2006.01) | |
| C04B 41/45 | (2006.01) | |

(52) U.S. Cl.
CPC ........ *C04B 41/5066* (2013.01); *C04B 35/565* (2013.01); *C04B 41/4527* (2013.01);
(Continued)

(58) Field of Classification Search
CPC .............. C04B 35/565; C04B 41/5059; C04B 41/5042; C04B 41/5024; C04B 41/4543; C04B 41/4527; C04B 41/5066
See application file for complete search history.

(56) References Cited

U.S. PATENT DOCUMENTS 4,776,866 A * 10/1988 Chen ................... C03C 10/0036
264/631
5,422,319 A * 6/1995 Stempin .................... C03C 8/02
501/6
(Continued)

FOREIGN PATENT DOCUMENTS

| EP | 1666437 | 6/2006 | |
|---|---|---|---|
| GB | 2455852 A * | 6/2009 | ........... C04B 41/009 |

OTHER PUBLICATIONS

European Search Report for European Patent Application No. 20188042.4 completed Dec. 18, 2020.

*Primary Examiner* — Alex B Efta
(74) *Attorney, Agent, or Firm* — Carlson, Gaskey & Olds, P.C.

(57) ABSTRACT

A method of fabricating a coating includes providing a ceramic matrix composite that includes SiC fibers disposed in a SiC matrix, depositing a base slurry on the ceramic matrix composite, wherein the base slurry contains powders of a metal oxide, at least one of silicon carbide, silicon nitride, or free silicon, and barium-magnesium-aluminosilicate in a first carrier fluid, drying the deposited base slurry to produce a base green layer, depositing a transition slurry on the base green layer, wherein the transition slurry contains powders of a metal oxide, at least one of silicon carbide, silicon nitride, or free silicon, at least one of zirconium carbide, zirconium nitride, or zirconium oxide, and barium-magnesium-aluminosilicate in a second carrier fluid, drying the deposited transition slurry to produce a transition green layer, and forming a consolidated coating on the ceramic matrix composite by heating the base green layer and the at least one transition green layer to cause chemical reactions that convert the powders to metal-silicon-oxygen rich phase and metal-zirconium-oxygen rich phase.

8 Claims, 2 Drawing Sheets

(52) U.S. Cl.
CPC ...... *C04B 41/4543* (2013.01); *C04B 41/5024* (2013.01); *C04B 41/5042* (2013.01); *C04B 41/5059* (2013.01)

(56) References Cited

U.S. PATENT DOCUMENTS

| | | | |
|---|---|---|---|
| 7,867,575 B2 | 1/2011 | Boutwell et al. | |
| 9,133,541 B2 | 9/2015 | Lee | |
| 10,145,252 B2 | 12/2018 | Kirby et al. | |
| 2007/0014996 A1* | 1/2007 | Bhatia | C23C 28/341 |
| | | | 427/446 |
| 2010/0255260 A1* | 10/2010 | Lee | C04B 41/52 |
| | | | 428/164 |
| 2011/0217511 A1* | 9/2011 | Kirby | C04B 35/6263 |
| | | | 428/141 |
| 2016/0332922 A1* | 11/2016 | Tang | C23C 28/044 |
| 2018/0320270 A1 | 11/2018 | Nardi et al. | |
| 2019/0092701 A1 | 3/2019 | Gong et al. | |

* cited by examiner

METHOD FOR FABRICATING AN ENVIRONMENTAL BARRIER COATING ON A CERAMIC MATRIX COMPOSITE

BACKGROUND

Components in a gas turbine engine often include barrier coatings to protect the underlying component from the effects of the severe operating environment. Barrier coatings are available in numerous varieties, which can include thermal barrier coatings and environmental barrier coatings. Thermal barrier coatings are typically designed for maximizing thermal insulation of a component from the surrounding high-temperature environment. Environmental barrier coatings are typically designed for maximizing resistance of infiltration or attack by environmental substances.

SUMMARY

A method of fabricating a coating according to an example of the present disclosure includes providing a ceramic matrix composite that includes SiC fibers disposed in a SiC matrix. A base slurry is deposited on the ceramic matrix composite and is dried to produce a base green layer. A transition slurry is deposited on the base green layer and is dried to produce a transition green layer. The base slurry contains powders of a metal oxide, at least one of silicon carbide, silicon nitride, or free silicon, barium-magnesium-aluminosilicate, and a first carrier fluid. The transition slurry contains powders of a metal oxide, at least one of silicon carbide, silicon nitride, or free silicon, at least one of zirconium carbide, zirconium nitride, or zirconium oxide, barium-magnesium-aluminosilicate, and a second carrier fluid. A consolidated coating is formed on the ceramic matrix composite by heating the base green layer and the at least one transition green layer to cause chemical reactions that convert the powders of the at least one of the silicon carbide, silicon nitride, or free silicon, and the at least one of the zirconium carbide, zirconium nitride, or zirconium oxide to, respectively, metal-silicon-oxygen rich phase and metal-zirconium-oxygen rich phase.

In a further embodiment of any of the foregoing embodiments, the metal oxide of the base slurry and the transition slurry is selected from the group consisting of HfO2, Y2O3, Yb2O3, Lu2O3, oxides of La, Ce, Pr, Nd, Pm, Sm, Eu, Gd, Tb, Dy, Ho, Er, Tm, and combinations thereof.

In a further embodiment of any of the foregoing embodiments, the metal oxide of at least one of the base slurry or the transition slurry is $HfO_2$.

In a further embodiment of any of the foregoing embodiments, the metal oxide of the base slurry and the transition slurry is $HfO_2$.

A further embodiment of any of the foregoing embodiments includes applying a topcoat on the consolidated coating, the topcoat being selected from the group consisting of rare earth silicates, $HfO_2$, and combinations thereof.

A further embodiment of any of the foregoing embodiments includes applying a topcoat on the consolidated coating, wherein the topcoat is $HfO_2$.

A further embodiment of any of the foregoing embodiments includes applying a topcoat on the consolidated coating, wherein the topcoat is $Gd_2Zr_2O_7$.

In a further embodiment of any of the foregoing embodiments, the metal-silicon-oxygen rich phase is $HfSiO_4$ and the metal-zirconium-oxygen rich phase is $HfZrO_4$ or $HfO_2$ and $ZrO_2$.

In a further embodiment of any of the foregoing embodiments, the consolidated coating has a porosity, by volume, of 1% to 20%.

In a further embodiment of any of the foregoing embodiments, the first carrier fluid and the second carrier fluid are water.

In a further embodiment of any of the foregoing embodiments, the heating is conducted at 1482° C.+/−125° C. in air for at least 1 hour.

A method of fabricating a coating according to an example of the present disclosure includes providing a ceramic matrix composite that includes SiC fibers disposed in a SiC matrix. A base slurry is deposited on the ceramic matrix composite and is dried to produce a base green layer. A transition slurry is deposited on the base green layer and is dried to produce a transition green layer. The base slurry contains, in parts by weight, 35-60 of a metal oxide powder, 5-20 of at least one of silicon carbide powder, silicon nitride powder, or free silicon powder, and 0.2-10 of barium-magnesium-aluminosilicate powder in a first carrier fluid. The transition slurry contains, in parts by weight, 35-60 of a metal oxide powder, an amount $X_1$ of at least one of silicon carbide powder, silicon nitride powder, or free silicon powder, an amount $X_2$ of at least one of zirconium carbide powder, zirconium nitride powder, or zirconium oxide powder, and 0.2-10 of barium-magnesium-aluminosilicate powder in a second carrier fluid. The total amount of $X_1+X_2$ is 5-20, and the amount $X_1$ is decreased and the amount of $X_2$ is increased through the deposition of the transition slurry. A consolidated coating if formed on the ceramic matrix composite by heating the base green layer and the transition green layer.

In a further embodiment of any of the foregoing embodiments, through the deposition of the transition slurry the amount $X_1$ is decreased to, and then held at, a non-zero amount, followed by decreasing the non-zero amount to zero.

In a further embodiment of any of the foregoing embodiments, the amount $X_1$ is decreased and the amount of $X_2$ is increased cooperatively such that through the deposition of the transition slurry $X_1+X_2$ is constant.

In a further embodiment of any of the foregoing embodiments, the amount $X_1$ is linearly decreased and the amount of $X_2$ is linearly increased.

In a further embodiment of any of the foregoing embodiments, the metal oxide of the base slurry and the transition slurry is selected from the group consisting of $HfO_2$, $Y_2O_3$, $Yb_2O_3$, $Lu_2O_3$, oxides of La, Ce, Pr, Nd, Pm, Sm, Eu, Gd, Tb, Dy, Ho, Er, Tm, and combinations thereof.

A further embodiment of any of the foregoing embodiments includes applying a topcoat on the consolidated coating, the topcoat being selected from the group consisting of $HfO_2$, $Gd_2Zr_2O_7$, and combinations thereof.

A gas turbine engine article according to an example of the present disclosure includes a ceramic matrix composite substrate that includes SiC fibers disposed in a SiC matrix, and a coating disposed on, and in contact with, the ceramic matrix composite. The coating includes, by volume percent, 5% to 20% of barium-magnesium-aluminosilicate, and a remainder of a metal-silicon-oxygen rich phase and a metal-zirconium-oxygen rich phase dispersed through the barium-magnesium-aluminosilicate.

In a further embodiment of any of the foregoing embodiments, the metal-silicon-oxygen rich phase is $HfSiO_4$ and the metal-zirconium-oxygen rich phase is $HfZrO_4$ or $HfO_2$ and $ZrO_2$.

In a further embodiment of any of the foregoing embodiments, the coating has a porosity, by volume, of 1% to 20%.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Environmental barrier coatings ("EBC") can be used in components of gas turbine engines, such as airfoils, combustors, and outer air seals, to protect underlying substrates from infiltration and/or attack by environmental substances. One such substance is calcium-magnesium-aluminosilicate, which is known as "CMAS." Debris such as dirt, sand, and other foreign substances entrained in gas flow through an engine can include or produce CMAS. The CMAS is viscous, possibly molten, and can wick into surfaces and ultimately cause spallation. It has been discovered that the design of an EBC is further complicated by a competing factor of thermal compatibility with the underlying substrate and, in particular, ceramic matrix composite ("CMC") substrates composed of SiC/SiC (SiC fibers in SiC matrix). The coefficient of thermal expansion of SiC/SiC CMC substantially differs from known EBCs. As a result, thermal cycling can cause strain between an EBC and its substrate, which could have potential to reduce durability of the EBC. In this regard, as will be described further herein, the disclosed EBC is configured to more closely match the coefficient of thermal expansion of SiC/SiC CMCs while maintaining functionality as an environmental barrier.

Figure 1:
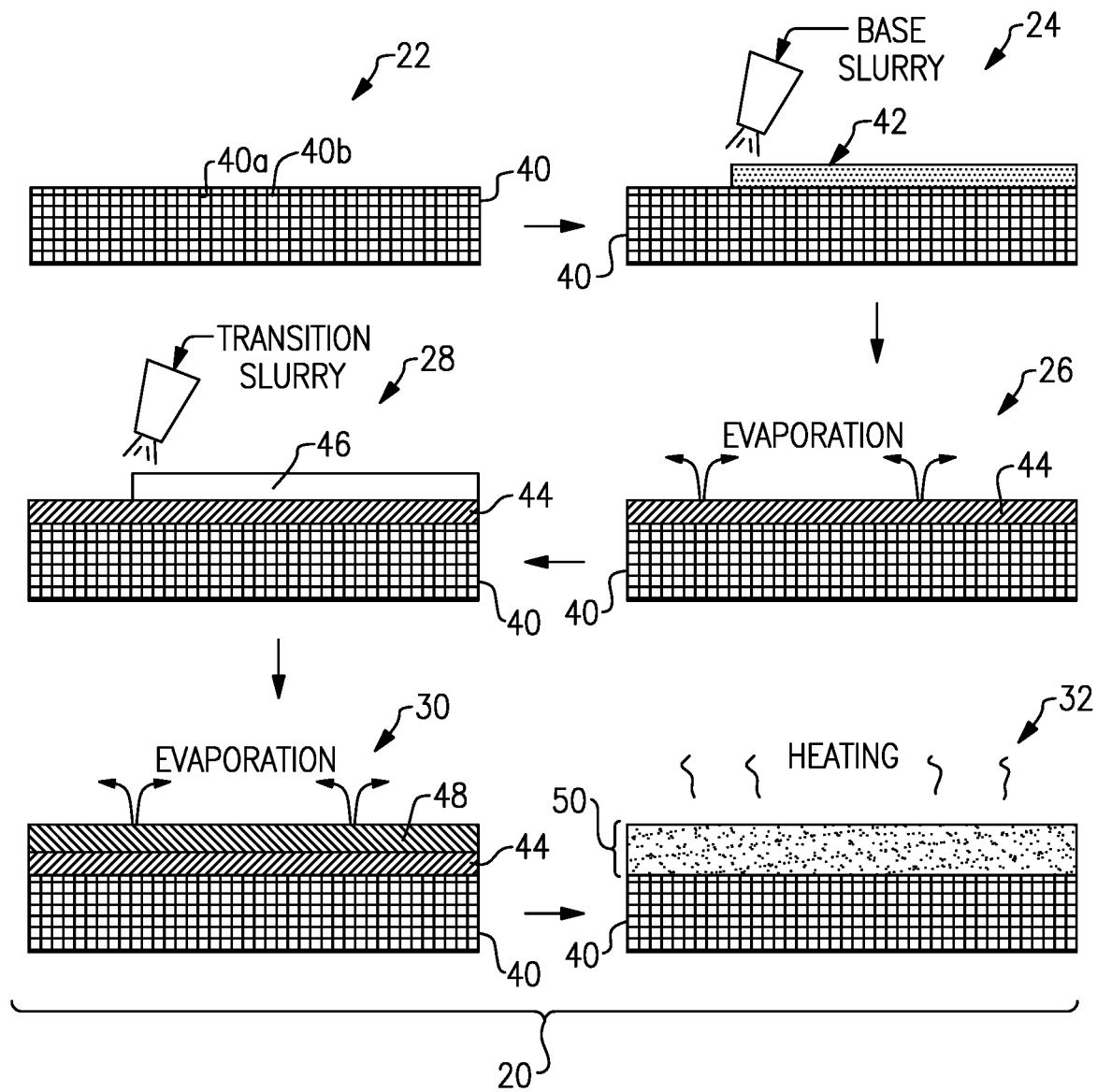
FIG. 1 depicts a method for fabricating an environmental barrier coating.

FIG. 1 schematically depicts an example method 20 of fabricating an EBC. In general, the method will be described with reference to steps 22, 24, 26, 28, 30, and 32. It is to be understood, however, that the steps are not necessarily separate or distinct and that steps may overlap in time or space.

The method 20 begins at step 22 with the provision of a ceramic matrix composite 40 ("CMC 40"). The CMC 40 includes SiC fibers 40a disposed in a SiC matrix 40b. The SiC fibers 40a may be provided in a fiber structure, such as but not limited to, woven structures, non-woven structures, unidirectional structures, or combinations of different structures that are stacked in layers. The provision of the CMC 40 may include furnishing the CMC 40 as a pre-fabricated substrate or, alternatively, fabricating the CMC 40 in whole or in part, such as through a ceramic infiltration process and/or pyrolysis process.

At step 24 a base slurry 42 is deposited on the CMC 40. The base slurry 42 contains powders of a metal oxide, at least one of silicon carbide, silicon nitride, or free silicon, and barium-magnesium-aluminosilicate in a first carrier fluid. As used herein, free silicon refers to silicon that is not bonded to other, different elements. For example, the metal oxide is selected from $HfO_2$, $Y_2O_3$, $Yb_2O_3$, $Lu_2O_3$, oxides of La, Ce, Pr, Nd, Pm, Sm, Eu, Gd, Tb, Dy, Ho, Er, Tm, and combinations thereof. In one further example, the first carrier fluid is water. Alternatively, other carrier fluids, such as polar or non-polar solvents can be used. The method of deposition is not particularly limited and can be, but is not limited to, air brushing, dipping, brushing, ultrasonic spraying, or suspension plasma spraying.

In one particular example, the base slurry 42 contains, in parts by weight, of the metal oxide powder, 5-20 of the silicon carbide powder, silicon nitride powder, and/or free silicon powder, and 0.2-10 of the barium-magnesium-aluminosilicate powder in the first carrier fluid. The weight of the barium-magnesium-aluminosilicate may include bound water weight. Unless stated otherwise, all composition amounts here are given in parts by weight. The metal oxide powder has an average powder particle size of approximately 1 micrometer to 2 micrometers, the silicon carbide, silicon nitride, and/or free silicon has an average powder particle size of approximately 1 micrometer to 2 micrometers, and the barium magnesium-aluminosilicate powder has powder particles size of −325 mesh, i.e., less than 45 micrometers. The amount of the first carrier fluid can be varied to adjust viscosity. For example, the base slurry 42 contains about 10 to 59 parts by weight of the first carrier fluid.

At step 26 the deposited base slurry 42 is dried to produce a base green layer 44. For instance, the drying can be conducted by heating the CMC 40 to evaporate the first carrier fluid. Additionally or alternatively, the drying can be conducted by permitting the deposited base slurry 42 to dwell at ambient temperature conditions, typically about 65° C. to until the first carrier fluid fully or substantially fully evaporates. In other examples, the rate of evaporation may be rapid such that little or no dwell is needed and the first carrier fluid fully or substantially fully evaporates as the base slurry 42 is deposited.

At step 28 a transition slurry 46 is deposited on the base green layer 44. The transition slurry 46 contains powders of a metal oxide, at least one of silicon carbide, silicon nitride, or free silicon, at least one of zirconium carbide, zirconium nitride, or zirconium oxide, and barium-magnesium-aluminosilicate in a second carrier fluid. For example, the metal oxide is also selected from $HfO_2$, $Y_2O_3$, $Yb_2O_3$, $Lu_2O_3$, oxides of La, Ce, Pr, Nd, Pm, Sm, Eu, Gd, Tb, Dy, Ho, Er, Tm, and combinations thereof. In one example, the metal oxide of the transition slurry 46 is the same as the metal oxide of the base slurry 42. In one further example, the second carrier fluid is also water. Alternatively, other carrier fluids, such as polar or non-polar solvents can be used. Again, the method of deposition is not particularly limited and can be, but is not limited to, air brushing, dipping, brushing, ultrasonic spraying, or suspension plasma spraying.

In one particular example, the transition slurry 46 contains, in parts by weight, 35-60 of the metal oxide powder, 5-20 of a combined amount of silicon carbide, silicon nitride, and/or free silicon powder and zirconium carbide powder, zirconium nitride powder, and/or zirconium oxide powder, and 0.2-10 of the barium-magnesium-aluminosilicate powder in the second carrier fluid. The metal oxide powder has an average powder particle size of approximately 1 micrometer to 2 micrometers, the silicon carbide, silicon nitride, and/or free silicon has an average powder particle size of approximately 1 micrometer to 2 micrometers, the zirconium carbide, zirconium nitride, or zirconium oxide has an average powder particle size of approximately 5 micrometers to 6 micrometers, and the barium magnesium-aluminosilicate powder has powder particles size of −325 mesh, i.e., less than 45 micrometers. The amount of the second carrier fluid can be varied to adjust viscosity. For example, the transition slurry 46 contains about 10 to 59 parts by weight of the second carrier fluid.

At step 30, similar to step 26, the deposited transition slurry 46 is dried to produce a transition green layer 48. For instance, the drying can be conducted by heating the CMC 40 to evaporate the second carrier fluid. Additionally or alternatively, the drying can be conducted by permitting the deposited transition slurry to dwell at ambient temperature conditions, typically about 65° C. to 75° C., until the second carrier fluid fully or substantially fully evaporates. In other examples, the rate of evaporation may be rapid such that little or no dwell is needed and the second carrier fluid fully or substantially fully evaporates as the transition slurry 46 is deposited. In one example, the final transition green layer 48 is provided at a thickness of approximately 100 micrometers to approximately 525 micrometers.

Upon consolidation, described further below, the base slurry 42 will provide a composition that closely matches the coefficient of thermal expansion of the CMC 40, while the transition slurry 46 will provide a composition with higher coefficient of thermal expansion and potential for enhanced CMAS resistance. In this regard, carbide of the base slurry 42 is silicon carbide while the transition slurry 46 may contain zirconium carbide, zirconium nitride, and/or zirconium oxide. For instance, in one example, the transition slurry 46 initially contains high level of silicon carbide and low level of zirconium carbide, zirconium nitride, or zirconium oxide. As the thickness of the transition green layer 48 increases, the composition of the transition slurry 46 is changed to reduce the level of silicon carbide and increase the level of zirconium carbide, zirconium nitride, or zirconium oxide. In one example, the final transition slurry 46 applied has little or no silicon carbide.

In one example, the transition slurry 46 contains an amount $X_1$ of silicon carbide powder, an amount $X_2$ of zirconium carbide, zirconium nitride, or zirconium oxide powder, and 0.2-10 of barium-magnesium-aluminosilicate powder in the second carrier fluid, and the total amount of $X_1+X_2$ is 5-20. The amount $X_1$ is decreased and the amount of $X_2$ is increased through the deposition of the transition slurry 46.

The amounts $X_1$ and $X_2$ can be adjusted through the deposition by mixing several slurries together. For instance, at the conclusion of the deposition of the base slurry 42, when the base green layer 44 has been deposited to a desired thickness, a second slurry can be mixed into the base slurry 42 to produce the transition slurry 46. The second slurry can contain of the metal oxide powder, 5-20 of zirconium carbide, zirconium nitride, or zirconium oxide powder, and 0.2-10 of the barium-magnesium-aluminosilicate powder in the second carrier fluid. As the deposition proceeds, additional amount of the second slurry can be mixed into the base slurry 42 to "dilute" the base slurry 42 and thereby in essence decrease the amount of silicon carbide powder being deposited and increase the amount of zirconium carbide, zirconium nitride, or zirconium oxide powder being deposited. Alternatively, rather than dilute the base slurry 42, several transition slurries 46 can be prepared with controlled, different amounts of $X_1$ and $X_2$. The transition slurries 46 can then be deposited successively, starting from the one with the highest amount $X_1$ and the lowest amount of $X_2$, followed by the slurry with the next highest amount $X_1$ and the next lowest amount of $X_2$, and so on and so forth. In another alternative, the composition of the transition slurry 46 is computer-controlled and can include feeding controlled amounts of slurry and/or powders to adjust composition of the transition slurry 46.

Using the above techniques, the amount $X_1$ can be decreased and the amount of $X_2$ increased according to a predefined profile. For example, through the deposition of the transition slurry 46 the amount $X_1$ is decreased to, and then held at, a non-zero amount, followed by decreasing the non-zero amount to zero. This provides a step-wise change in the composition, and several step changes can be used. In a further example, the amount $X_1$ is decreased and the amount of $X_2$ is increased cooperatively such that through the deposition of the transition slurry 46, $X_1+X_2$ is constant. This provides the same amount of carbide through the thickness of the transition green layer 48. In one additional example the amount $X_1$ is linearly decreased and the amount of $X_2$ is linearly increased. This provides a relatively, smooth, linear change in composition.

At step 32, a consolidated coating 50 is formed on the CMC 40 by heating the base green layer 44 and the transition green layer 48 to cause chemical reactions that convert the powders of the silicon carbide, silicon nitride, and/or free silicon and the zirconium carbide, zirconium nitride, or zirconium oxide to, respectively, metal-silicon-oxygen rich phase and metal-zirconium-oxygen rich phase. As an example, the heating is conducted at 1482° C.+/−125° C. in air for at least 1 hour and up to about 24 hours. For instance, the silicon carbide, silicon nitride, and/or free silicon and the zirconium carbide, zirconium nitride, or zirconium oxide first oxidize to form $SiO_2$ and $ZrO_2$, respectively. These oxides then react with the metal oxide to form the metal-silicon-oxygen rich phase and the metal-zirconium-oxygen rich phase. The reaction of the oxides may also involve a volume expansion, which may facilitate increasing density of the coating 50. Moreover, forming the metal-silicon-oxygen rich phase and the metal-zirconium-oxygen rich phase in situ rather than by using powders of these phases avoids spraying or handling the phases. To the extent that any silicon carbide and/or zirconium carbide, zirconium nitride, or zirconium oxide remains after the heating, the silicon carbide and/or zirconium carbide, zirconium nitride, or zirconium oxide may serve as an oxygen getter in the coating 50 by reacting with oxygen gas that infiltrates.

For instance, the coating 50 has a composition, by volume, of 1% to 20% of barium-magnesium-aluminosilicate and a remainder of a metal-silicon-oxygen rich phase and a metal-zirconium-oxygen rich phase dispersed through the barium-magnesium-aluminosilicate. The metal of the metal-silicon-oxygen rich phase and the metal-zirconium-oxygen rich phase is the metal of the metal oxide in the slurry powders, i.e., hafnium from $HfO_2$, yttrium from $Y_2O_3$, ytterbium from $Yb_2O_3$, lutetium from $Lu_2O_3$, or the metals La, Ce, Pr, Nd, Pm, Sm, Eu, Gd, Tb, Dy, Ho, Er, Tm from the corresponding oxides. For example, if $HfO_2$ is used, the metal-silicon-oxygen rich phase is $HfSiO_4$ and the metal-zirconium-oxygen rich phase is $HfZrO_4$. The coating 50 may also have residual porosity. For instance, the coating has a porosity, by volume, of 1% to 20%.

The method 22 may be used for an initial or original manufacture of the coating 50, as a repair to patch or replace an existing EBC, or even to apply the coating 50 as a bond layer between other coatings or components.

Figure 2:
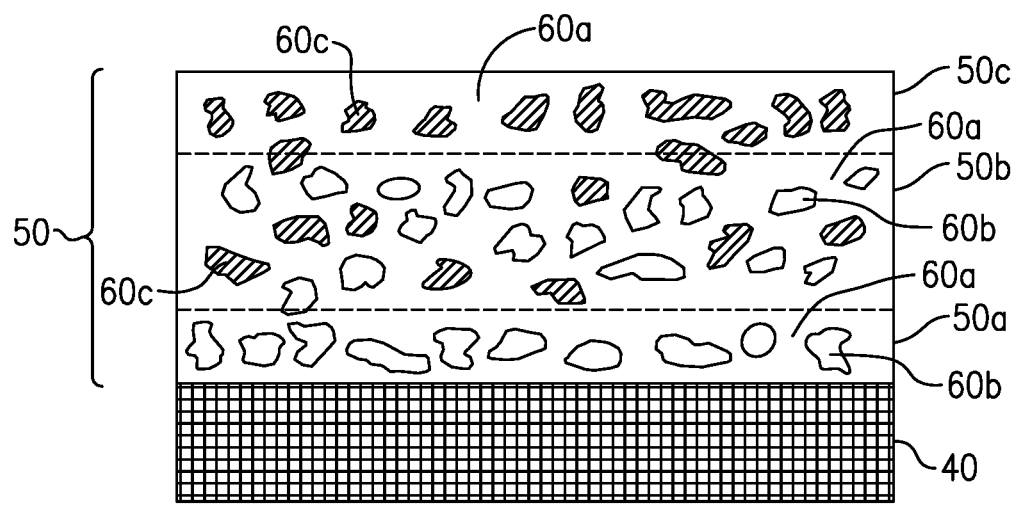
FIG. 2 illustrates a sectioned view of an environmental barrier coating.

FIG. 2 shows a sectioned view of the coating 50. The coating 50 includes sub-layers 50a, 50b, and 50c, denoted by dashed lines. The sub-layer 50a is in contact with the CMC 40 and is the layer that results from the base slurry 42, while sub-layers 50b and 50c overlay the sub-layer 50a and are the layers that result from the transition slurry 46. In these regards, the sub-layer 50a has a barium-magnesium-aluminosilicate matrix 60a and the metal-silicon-oxygen rich phase 60b dispersed there through; the sub-layer 50b has the barium-magnesium-aluminosilicate matrix 60a and the metal-silicon-oxygen rich phase 60b and metal-zirconium-oxygen rich phase 60c dispersed there through; and the sub-layer 50c has the barium-magnesium-aluminosilicate matrix 60a and the metal-zirconium-oxygen rich phase 60c dispersed there through. That is, the sub-layer 50a directly in contact with the CMC 40 has metal-silicon-oxygen rich phase 60b, which has a coefficient of thermal expansion that closely matches the CMC 40. As an example, the CMC 40 has a coefficient of thermal expansion of approximately $4 \times 10^{-6}/°$ C., while the metal-silicon-oxygen rich phase 60b has a coefficient of thermal expansion of approximately $4.5 \times 10^{-6}/°$ C. The sub-layer 50b provides a transition or graded layer in which the metal-silicon-oxygen rich phase 60b decreases and the metal-zirconium-oxygen rich phase 60c increases. The sub-layer 50c has metal-zirconium-oxygen rich phase 60bc, which has a higher coefficient of thermal expansion that the CMC 40 but enhanced potential for CMAS resistance.

Figure 3:
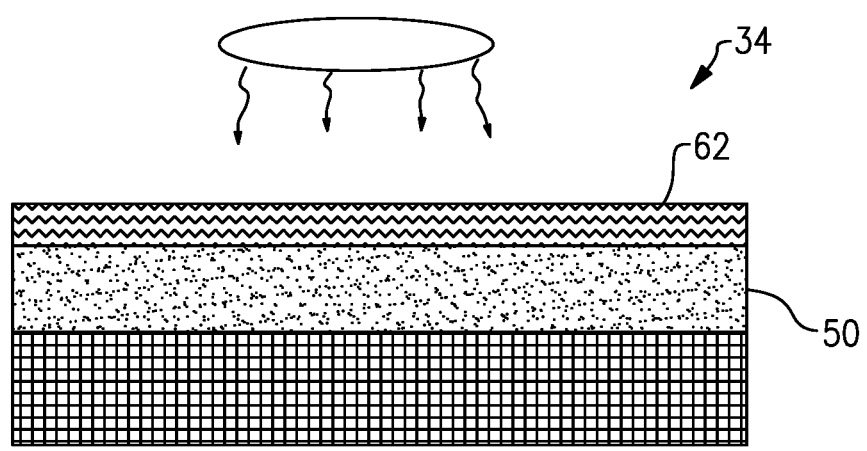
FIG. 3 depicts another step that can be used in the method, to apply a topcoat.

FIG. 3 depicts an additional step 34 that can be used in the method 22, after step 32. The step 34 includes applying a topcoat 62 on the consolidated coating 50, for additional CMAS resistance. For example, the topcoat 62 is selected from rare earth silicates, $HfO_2$, or combinations thereof. In one additional example, the topcoat 62 is $Gd_2Zr_2O_7$. The topcoat 62 can be applied by air plasma spray or electron beam physical vapor deposition, but other methods may alternatively be used.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method of fabricating a coating, the method comprising:
    providing a ceramic matrix composite that includes SiC fibers disposed in a SiC matrix;
    depositing a base slurry on the ceramic matrix composite, wherein the base slurry contains, in parts by weight, 35-60 of a metal oxide powder, 5-20 of at least one of silicon carbide powder, silicon nitride powder, or free silicon powder, and 0.2-10 of barium-magnesium-aluminosilicate powder in a first carrier fluid;
    drying the deposited base slurry to produce a base green layer;
    depositing a transition slurry on the base green layer, wherein
        the transition slurry contains, in parts by weight, 35-60 of a metal oxide powder, an amount $X_1$ of at least one of silicon carbide powder, silicon nitride powder, or free silicon powder, an amount $X_2$ of at least one of zirconium carbide powder, zirconium nitride powder, or zirconium oxide powder, and 0.2-10 of barium-magnesium-aluminosilicate powder in a second carrier fluid,
        the total amount of $X_1+X_2$ is 5-20, and
        the amount $X_1$ is decreased and the amount of $X_2$ is increased through the deposition of the transition slurry;
    drying the deposited transition slurry to produce a transition green layer; and
    forming a consolidated coating on the ceramic matrix composite by heating the base green layer and the transition green layer.

2. The method as recited in claim 1, wherein through the deposition of the transition slurry the amount $X_1$ is decreased to, and then held at, a non-zero amount, followed by decreasing the non-zero amount to zero.

3. The method as recited in claim 1, wherein the amount $X_1$ is decreased and the amount of $X_2$ is increased cooperatively such that through the deposition of the transition slurry $X_1+X_2$ is constant.

4. The method as recited in claim 1, wherein the amount $X_1$ is linearly decreased and the amount of $X_2$ is linearly increased.

5. The method as recited in claim 1, wherein the metal oxide of the base slurry and the transition slurry is selected from the group consisting of $HfO_2$, $Y_2O_3$, $Yb_2O_3$, $Lu_2O_3$, oxides of La, Ce, Pr, Nd, Pm, Sm, Eu, Gd, Tb, Dy, Ho, Er, Tm, and combinations thereof.

6. The method as recited in claim 5, further comprising applying a topcoat on the consolidated coating, the topcoat being selected from the group consisting of $HfO_2$, $Gd_2Zr_2O_7$, and combinations thereof.

7. The method as recited in claim 1, wherein the metal oxide of at least one of the base slurry or the transition slurry is $HfO_2$.

8. The method as recited in claim 1, wherein the metal oxide of the base slurry and the transition slurry is $HfO_2$.

* * * * *